United States Patent [19]

Mini

[11] 4,308,049

[45] Dec. 29, 1981

[54] PROCESS FOR THE ABSORPTION OF AMMONIA IN ACID SOLUTIONS OR SLURRIES

[75] Inventor: Iti Mini, Milan, Italy

[73] Assignee: Montedison, S.p.A., Italy

[21] Appl. No.: 964,160

[22] Filed: Nov. 28, 1978

Related U.S. Application Data

[63] Continuation of Ser. No. 829,049, Aug. 30, 1977, abandoned, which is a continuation-in-part of Ser. No. 767,627, Feb. 10, 1977, abandoned, which is a continuation of Ser. No. 634,894, Nov. 24, 1975, abandoned.

[30] Foreign Application Priority Data

Nov. 29, 1974 [IT] Italy ............................. 30013 A/74

[51] Int. Cl.$^3$ ........................... C05C 1/00; C05C 3/00; C05B 7/00
[52] U.S. Cl. ............................................. 71/39; 71/40; 71/41; 71/43; 71/64.8; 71/64.10; 423/310; 423/313; 423/396; 423/549
[58] Field of Search ................... 71/43, 64 C, 34, 35, 71/36, 39, 41, 61, 51, 44, 40, 64.8, 64.10; 423/305, 310, 312, 313, 315, 396, 549, 550

[56] References Cited

U.S. PATENT DOCUMENTS

| | | | |
|---|---|---|---|
| 3,419,378 | 12/1968 | Kearns | 71/43 |
| 3,502,441 | 3/1970 | Hudson | 23/259.1 |
| 3,503,706 | 3/1970 | Legal | 71/43 |
| 3,733,191 | 5/1973 | Meline | 423/305 |
| 3,949,058 | 4/1976 | Young | 423/305 |

*Primary Examiner*—Ernest G. Therkorn
*Attorney, Agent, or Firm*—Stevens, Davis, Miller & Mosher

[57] ABSTRACT

A process is disclosed for the absorption of gaseous or liquid ammonia in acid solutions or slurries, including an ammonia absorption zone separated from a water vapor generation zone disposed at a higher level. A pressure difference is created between the two zones, so that the ammonia absorption takes place completely in the neighborhood of the point of inflow of the ammonia, with a temperature increase localized only near to said inflow point, and thus without giving rise to the generation of water vapor which therefore takes place in a liquid-vapor separation zone located at a higher level with respect to the ammonia absorption zone. The acid solutions or slurries to be neutralized may consist essentially of solutions of phosphoric acid, sulphuric acid, nitric acid, solutions resulting from the nitric acid attack on phosphorites, acid slurries resulting from nitric acid attack or sulphonitric acid attack on phosphorites, or mixtures thereof. Circulation of the acid solutions or slurries is effected by a pump or by gravity. The effect of a difference in height may be brought about by a suitable pressure loss.

8 Claims, 1 Drawing Figure

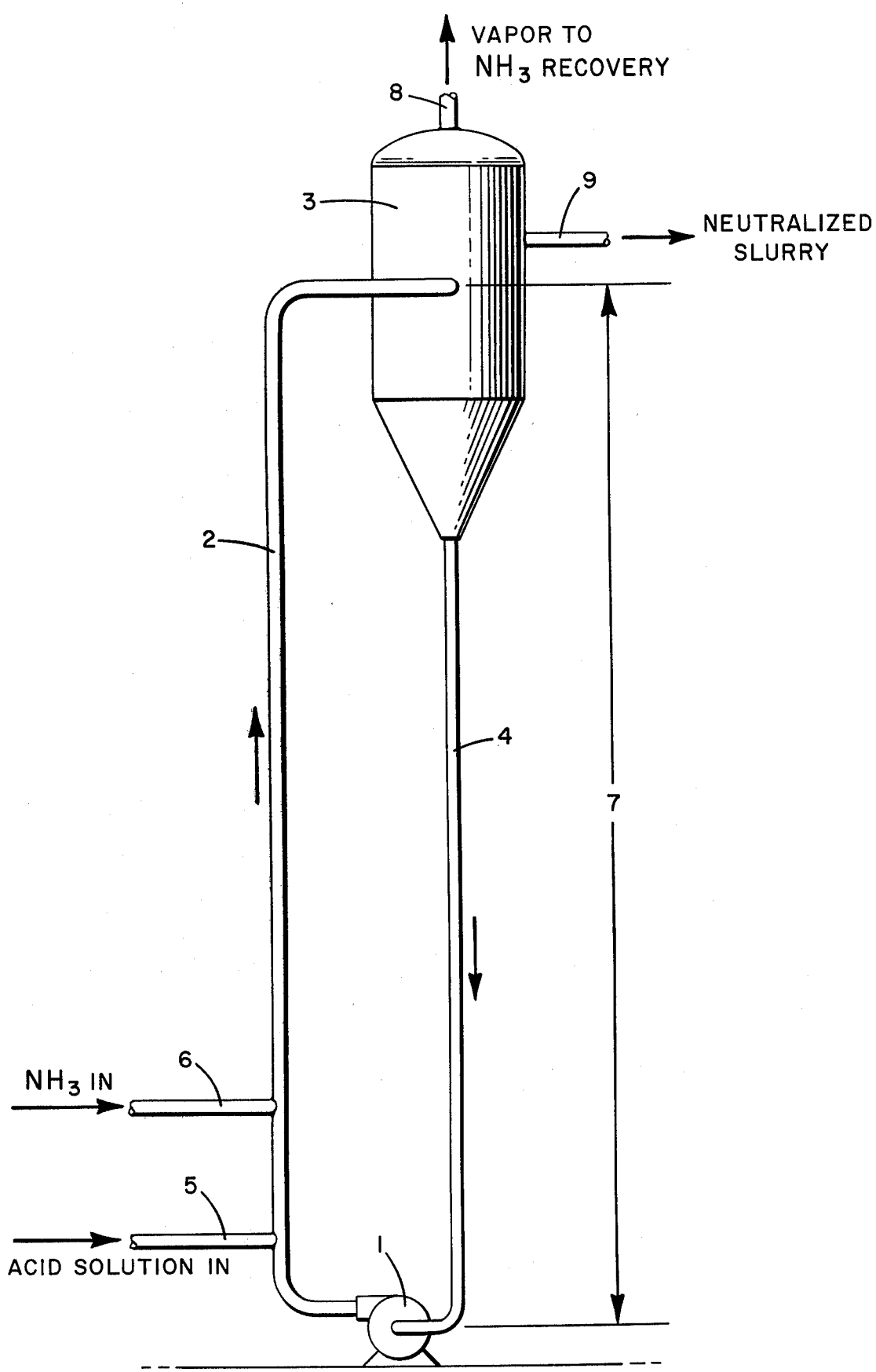

PROCESS FOR THE ABSORPTION OF AMMONIA IN ACID SOLUTIONS OR SLURRIES

This is a continuation of application Ser. No. 829,049 filed Aug. 30, 1977, which in turn is a continuation-in-part of application Ser. No. 767,627, filed Feb. 10, 1977, which is a continuation of Ser. No. 634,894, filed Nov. 24, 1975 all now abandoned.

The present invention relates to a process for the absorption of ammonia in acid solutions or slurries. The process is particularly suited for the absorption of gaseous or liquid ammonia in solutions of strong acids such as, for instance, sulphuric acid or nitric acid, or in solutions of phosphoric acid or mixtures of phosphoric acid with other compounds such as, for instance, slurries resulting from the nitric or sulphonitric acid attack on phosphorites.

In the preparation of fertilizers, the continuous absorption of ammonia in acid solutions or slurries is accompanied by various drawbacks. For example, in the case of the absorption of ammonia in strong acids, such as for instance sulphuric or nitric acid, the drawbacks involve atmospheric effluents. On the other hand, when the ammonia absorption medium contains or consists essentially of phosphoric acid, other problems arise due to the viscosity of the absorption medium and the $NH_3$ vapor tension of phosphoric acid neutralized between the states of monoammonium and diammonium phosphates.

The absorption of gaseous ammonia in phosphoric acid develops about 1,650 kCal/kg of $NH_3$ up to monoammonium phosphate and about 1,000 kCal/kg of $NH_3$ between monoammonium and diammonium phosphates. Taking into account both the heating of the absorption medium and the pre-heating when the recovery of the ammoniacal gases is industrially applied, the absorption causes the development of water vapor to an extent between 1 and 2.2 kg of $H_2O$/kg of $NH_3$. This water vapor dilutes the gaseous ammonia in the absorption stage, and therefore generally makes it necessary to use special equipment. In general, reactors fitted with stirrers are used, and these impose high energy demands in order to facilitate dispersion of the ammonia in the absorption medium.

The phenomenon does not vary substantially, if instead of gaseous $NH_3$, liquid $NH_3$ is used which evaporates and becomes diluted in the absorption medium.

A particular instance is the absorption of $NH_3$ during the neutralization of phosphoric acid until one obtains as end product diammonium phosphate with a degree of end neutralization, that is a ratio of $(NH_3)/(H_3PO_4)$ in the fertilizer, equal to 2.

The processing scheme for manufacturing the fertilizer is based in general on a "wet" stage involving a first neutralization, and a "dry" stage involving the final neutralization. In general, one starts from a phosphoric acid having 40–42% of $P_2O_5$. Under these conditions, the exothermic nature of the reaction is such that almost the whole of the water is evaporated so that it remains necessary only to remove by drying a quantity of water corresponding to 5–10% by weight of the fertilizer.

The neutralization with $NH_3$ is brought about in the humid or wet stage of the process, that is in the slurry, to the maximum extent possible, bearing in mind that as the neutralization proceeds the water content decreases as well as the solubility and, thus, the fluidity of the slurry, and that its $NH_3$ vapor tension increases, both factors influencing unfavorably the ammonia absorption and thereby causing an increased loss. Moreover, one must also bear in mind that during this neutralization operation the fluorine coming from the starting phosphorites is stripped, with consequential drawbacks of an ecological or environmental nature.

The residual ammonia is then conveyed to the granulation stage where, however, there occurs the drawback of a greater loss of ammonia because the quantity of $NH_3$ to be absorbed and the contribution of heat simultaneously increase. This loss is compensated for by means of fresh phosphoric acid, but also during this operation fluorine becomes stripped in a quantity practically proportional to the absorbed ammonia, with consequential drawbacks of an ecological nature or environmental nature as previously mentioned.

In consequence of the previously mentioned two points, a compromise is made between the two degrees of ammonization in the slurry and in the solid. In general, 75% of the $NH_3$ is fed into the slurry, attaining the final degree of neutralization in the dry stage.

When proceeding in this way the following drawbacks are encountered:

the considerable quantity of $NH_3$ to be absorbed in the granulation and dry neutralization stage requires granulators of considerable size;

in the neutralization stage of the slurry the absorption causes the formation of foams and bubbles in the lower part of the reactor, which sometimes cause overflowing or flooding of the whole mass in the reactor. Moreover, said absorption is never very high, given the fact that the loss in $NH_3$ always turns out to be rather greater than the vapor tension of $NH_3$;

the total loss of $NH_3$ sent to recovery is between 10 and 25% of the total $NH_3$.

More or less identical drawbacks are encountered with slurries containing phosphoric acid, for instance those derived from sulphonitric or phospho-nitric acid attack or nitric acid attack followed by processes described in the prior art, such as for instance the Odda process and other like processes.

In nitric acid neutralization plants for the production of ammonium nitrate, in general there is a smaller loss of $NH_3$ with the fumes since the $NH_3$ vapor tension of the solution where the neutralization reaction takes place is very low, although the loss is not at all negligible. Moreover, there is a formation of "smoke" or mist due to reaction between $HNO_3$ and $NH_3$ vapors in the water vapor that develops.

In consequence thereof both ecological problems and problems of plant costs for the elimination of the smoke or mist arise.

Similar problems are encountered upon neutralization with sulphuric acid.

Thus, a principal object of this invention is that of providing a process that will avoid or at least reduce the drawbacks mentioned above.

Another object of this invention is that of providing a process that will be readily applicable on an industrial scale.

These and still other objects are achieved by means of the present invention which comprises the feature of keeping the ammonia absorption zone separated from the water vapor generation zone which is at a higher level, thereby creating a pressure difference between the two zones, so that the absorption of the ammonia will take place completely in the neighborhood of the point of introduction of the $NH_3$ into the acid solution or slurry, with the temperature increase consequently localized exclusively near said point of introduction and thus without giving rise there to the generation of water vapor which, on the contrary, takes place in a liquid-vapor separation apparatus located at a higher level with respect to the ammonia absorption zone.

The accompanying drawing illustrates schematically a method for one practical embodiment of this invention.

A circulating pump 1 forces the acid solution or slurry through a pipe 2 where it is to be neutralized and thence into a separating device 3 for the separation of liquid and vapor, such as for instance a flash chamber, a cyclone or other similar apparatus per se well known in the prior art.

The separating device 3 is connected with the pump 1 in a closed cycle or circuit via pipe 4. The acid solution or slurry to be neutralized is introduced into the circuit 1-2-3-4 through a pipe 5 which feeds into the system at any convenient point of the circuit such as for instance pipe 2 as shown or pipe 4 (in a manner not shown) in order to facilitate the mixing of the ammonia with the circulating liquid. The ammonia for neutralization is introduced into the circuit via pipe 6 located downstream of the acid inflow which takes place via line 5.

By taking into account the flow rate of the pump 1, the difference in height or vertical elevation 7 of the separating device 3 above the pump 1, and possibly, for low values of height, the diameter (at the point of connection) between pipe 2 and separating device 3, there occurs a complete absorption, without evaporation, and with an increase of temperature only in the neighborhood of the point where pipe 6 connects with pipe 2.

For instance, with 1 metric ton per hour of $NH_3$, and a circulating slurry with a specific heat of 0.4 kCal/kg°C. and a specific weight of 1.5 kg/dm$^3$, it is possible to operate with the following values by way of example:
5 m difference in height and 200 m$^3$/hr; or
10 m difference in height and 140 m$^3$/hr; or
30 m difference in height and 60 m$^3$/hr;
where the difference in height may be partially or totally compensated by a restriction of the diameter of the connection between the pipe 2 and the separating device 3.

Operating under the above-mentioned conditions, the temperature rise of the slurry will not be to such an extent as to bring about boiling in or close to the absorption point of the $NH_3$, i.e., in the vicinity of the inlet of $NH_3$ via line 6, but will be rather more downstream, that is after the absorption of the $NH_3$ will already have been completed or substantially completed.

Evaporation or evolution of water vapor, on the contrary, will start in the upper part of the pipe 2 and will be completed in the liquid-vapor separator 3 where a predetermined level of boiling slurry will be established. The vapor will flow out of the liquid vapor separator via pipe 8, and if desired will go to a system for the recovery of $NH_3$ (for slurries having vapor tension of $NH_3$ greater than zero), while a portion of the neutralized slurry will leave the system via pipe 9 because exceeding the predetermined level in separator 3, in quantities corresponding to the inflow of reactants: the level of the slurry in separating device 3 will be thus determined by the outflow 9.

As can be seen from the drawing, pipe 2 enters the separator 3 below the level established by overflow 9.

The recycling slurry, in general at a flow rate very much high than that of the neutralized slurry flowing out of pipe 9, after flowing through the separating device 3 from the top downwards, will leave via pipe 4 as described above. Since the evaporation in separator 3 is thus completely separate and detached from the absorption of the $NH_3$ that takes place in pipe 2, and especially the lower part thereof that therefore functions as a neutralization reactor, the developed vapor will be in perfect thermodynamic equilibrium with the liquid which forms the slurry and, consequently, in general, even with very high degrees of neutralization, will consist or consist essentially of water vapor with a minimum content of $NH_3$.

Using such equipment for the process of this invention, one will achieve the advantage of being able to treat slurries having viscosities much greater than those of the slurries treated in ways previously known in the prior art. Thus, it is easily possible to treat slurries having viscosities of from 1500 to 2000 cp without encountering either absorption problems or problems of overflow of the slurry. As a consequence it is always possible, in the neutralization of a slurry, to reach neutralization values which are decidedly greater than the values normally obtained, that is to say, up to $(NH_3)/(H_3PO_4)$ ratios of 1.8. Under such conditions, in fact, the loss of $NH_3$ is independent of the viscosity of the slurry; the absorption being an almost instantaneous phenomenon, given the lack of a superficial gaseous layer or barrier that would exert resistance to efficient or rapid absorption of the $NH_3$ in the reaction zone (lower portion of the pipe 2).

The loss of $NH_3$ is due to the vapor tension of the liquid and is thus decidedly lower than that which occurs in a stirrer-fitted reactor commonly used when operating according to the prior art. Such a loss would be intolerable in the conventional systems for higher degrees of neutralization. Moreover, it is possible to operate at reaction equilibria muh closer to the final equilibria, that is to say of the solid reaction product, thereby favoring the operation of the whole dry part. This is particularly useful when one operates with slurries containing calcium, where unstable equilibria might cause the precipitation of $P_2O_5$ in an insoluble form and thus detract from the overall effective recovery of useful product.

Lastly, it must be pointed out that when operating according to the method of this invention, there are, practically, no limits to the maximum potentiality or capacity. On the contrary, the greater its potentiality, the better the process operates. Consequently whatever the capacity of the fertilizer plant, it is always possible to operate with just one neutralization unit which can be fed with all the acids (phosphoric, nitric, attack slurries, etc.) which enter into circulation in the system and with all the ammonia (except for that which goes to granulation), with consequently a significant advantage of an economical character.

If the ammonia absorption equipment is arranged with a sufficiently large difference in levels between the point of ammonia introduction and the point of vapor-liquid separation, and if the slurry is of sufficiently low viscosity, the circulating pump may then be omitted since in that case the desired circulation may be brought about by virtue of the difference between the specific weight of the neutralized slurry in the descending column 4 and the specific weight of the slurry undergoing neutralization in the ascending column 2 in which latter steam develops only in the upper part of the ascending column due to the head of liquid therein.

The above described arrangement of apparatus represents only one of the many possible practical embodiments for carrying out the process of this invention, and thus various other specifically different constructional systems may be used for the purpose, such as for instance a system in which pipes 2 and 4 are arranged in a concentric relation to each other. Moreover, the effect of the differences in height may be simulated by losses in pressure. The important thing is that between the zone of absorption of $NH_3$ (at an effectively lower level and therefore a higher pressure) and the steam developing zone (at an effectively higher level and therefore lower pressure), the difference in pressure shall be such as to allow a distinct separation of the two phenomena in the system, i.e., the region of ammonia absorption by the acid slurry and the region of vapor-liquid separation of the reacted slurry.

In order still better to illustrate this invention, the following examples are given.

EXAMPLE 1

50 t/hr (metric tons) of phosphoric acid diluted to 40 percent of $P_2O_5$, and slightly ammonized through the recovery of the escaping $NH_3$, were fed via pipe 5 into an apparatus as shown schematically in the accompanying drawing, together with 8.5 t/hr of gaseous $NH_3$, at a flow rate of 1000 m$^3$/hr of slurry at 110° C., and with a specific heat of 0.45 kCal/kg°C., via pipe 6.

The introduction of the $NH_3$ into the pipe 2 occurs at a point 12 m below the surface level of the liquid in the separator 3. The heat input amounts to 12,000,000 kCal/hr, of which 8,500,000 kCal/hr bring about the evaporation of 15.5 t/hr of water, while the remainder of the heat is employed for heating up the reactants and the dispersion or slurry.

The circulating slurry warms up to about 130° C. and attains a vapor tension of 1500 torr, compensated by a head of 11.5 m of liquid in the column with a specific weight equal to 1.5 kg/dm$^3$ in the separator 3.

The steam leaving via pipe 8 has a content of $NH_3$ of 2%, corresponding to a loss of 3.5%, that is to say, 300 kg/hr.

43 t/hr of slurry, having a content of 46% of $P_2O_5$, 16% of $NH_3$, and 10% of water, and having a viscosity of 1000 cp, flow out of the system via pipe 9. This slurry is utilized for the production of ammonium phosphate fertilizer by per se conventional procedures not shown.

For the final neutralization there were conveyed to the solid neutralization stage a further 1.25 t/hr of $NH_3$ of which 1.10 t/hr were absorbed and 150 kg/hr were recovered. In total, to recovery there were conveyed about 450 kg corresponding to 4.5% of the inflowing $NH_3$, which were recovered from the same phosphoric acid before its neutralization.

The following Table gives a summary of data relating to the thermal balance in the reaction between the phosphoric acid and the ammonia according to the foregoing Example 1:

TABLE

| | |
|---|---|
| Acid fed to the reaction | 50 m.tons/hr at 50° C. |
| $NH_3$ fed for absorption and reaction | 8.5 m.tons/hr at 50° C. |
| Recycle fed to the reaction zone | 1500 m.tons/hr at 110° C. (1000 m$^3$ with a specific weight of 1.5 kg/dm$^3$ |
| Total quantity fed to the reaction zone | 1558.5 m.tons/hr at 108° C. |
| Evaporated water | 15.5 m.tons/hr |
| Total reaction heat | 47,620,010 Btu/hr 12,000,000 Kcal/hr |
| Temperature increase of the mass in the hypothetical case of a reaction without heat development: | |
| With recycle (12,000,000/ 1558.5 × 10$^3$ × 0.45) | 17.1° C. (30.8° F.) |
| Hypothetical case without recycle (12,000,000/58.5 × 10$^3$ × 0.45) | 455.8° C. (820.5° F.) |
| Final temperature of the mass entering the reaction zone: | |
| With recycle | 125.1° C. (257.2° F.) |
| Without recycle (theoretical) | 505.8° C. (942.5° F.) |

Accordingly, thanks to the recycle one obtains a temperature increase in the mass of about 17° C. without evaporation in the reaction stage, by using a relatively small hydraulic head.

EXAMPLE 2

50 t/hr of slurry coming from the phospho-nitric acid attack on phosphorite, and having the following composition:

| | | |
|---|---|---|
| free $H_2O$ | = | 27.0% |
| bound $H_2O$ | = | 9.5% |
| $N_2O_5$ | = | 26.0% |
| $P_2O_5$ | = | 19.8% |
| CaO | = | 12.5% |
| $SO_4$ | = | 0.5% |
| $Fe_2O_3 + Al_2O_3$ | = | 0.7% |
| impurities | = | 4.0% | after having been used for the recovery of $NH_3$ escaping with the steam via pipe 8, were treated in an apparatus as shown in the accompanying drawing, with 4.5 t/hr of gaseous $NH_3$ in a flow of 750 m$^3$/hr of slurry neutralized at 130° C., with a specific heat of 0.4 kCal/kg°C. and a specific weight of 1.5 kg/dm$^3$. The addition of the $NH_3$ took place in pipe 2 at a level 7 m below the surface level of the liquid in separator 3.

The inflowing heat amounted to 7,000,000 kCal/hr of which 3,700,000 kCal/hr were used for heating up the reactants and the dispersion or slurry, while 3,300,000 kCal/hr were used for the evaporation of 5.9 t/hr of water.

The circulating neutralized slurry having the following composition:

| | | |
|---|---|---|
| $NH_3$ | = | 9.4% |
| free $H_2O$ | = | 14.2% |
| bound $H_2O$ | = | 10.0% |
| $N_2O_5$ | = | 27.2% |
| $P_2O_5$ | = | 20.7% |
| CaO | = | 13.1% |
| $SO_4$ | = | 0.5% |
| $Fe_2O_3 + Al_2O_3$ | = | 0.7% |
| impurities | = | 4.2% | was raised to a temperature of 137° C. and attained a vapor tension of about 900 torr, compensated by a slurry head of 6 m.

The vapor is freed in the separator 3 with a content in $NH_3$ of 3%, that is to say, equal to a loss in $NH_3$ of 4% and was sent to recovery. The neutralized slurry, flowing out at a viscosity 800 cp, went to the production of granular ammonium phosphate-nitrate fertilizer.

EXAMPLE 3

50 t/hr of a mixture of nitric acid and phosphoric acid of the following composition:

| | | |
|---|---|---|
| $N_2O_5$ | = | 24.5% |
| $P_2O_5$ | = | 20.2% |
| bound $H_2O$ | = | 16.9% |
| free $H_2O$ | = | 35.1% |
| $CaO + Fe_2O_3 +$ $Al_2O_3$ plus impurities | = | 3.3% | after having been used for the recovery of $NH_3$ escaping with the water vapor via pipe 8, were treated in an apparatus like the one shown in the accompanying drawing with 8 t/hr of gaseous $NH_3$ in a flow of 1000 $m^3$/hr of slurry at 145° C., specific weight=1.6 kg/$dm^3$, specific heat=0.42 kCal/kg°C.

The addition of the $NH_3$ takes place at a level 9 m below the surface level of the liquid in separator 3.

The inflowing heat amounted to 15,200,000 kCal/hr, of which 11,100,000 kCal/hr were used for the evaporation of 15.4 t/hr of water and 4,100,000 kCal/hr were used for heating up the reactants and the dispersion or slurry.

The circulating slurry having the following composition:

| | | |
|---|---|---|
| $NH_3$ | = | 18.8% |
| $N_2O_5$ | = | 28.8% |
| $P_2O_5$ | = | 23.7% |
| bound $H_2O$ | = | 19.8% |
| free $H_2O$ | = | 5.0% |
| impurities | = | 3.9% | was heated up to 162° C. and attained a vapor tension of about 1200 torr, compensated for by a head of 8.5 m.

The vapor that evolved had a content in $NH_3$ of 3.5%, equal to a loss of 3.5%, which goes to $NH_3$ recovery. The neutralized slurry is useful for the production of an ammonium phosphite-nitrate fertilizer.

EXAMPLE 4

50 t/hr of a 56% nitric acid were treated in the same apparatus with 7.55 t/hr of gaseous $NH_3$ in a flow of 1500 $m^3$/hr of ammonium nitrate solution at a concentration of 84% and at 135° C., specific heat=0.47 kCal/kg°C., specific weight=1.35 kg/$dm^3$. The addition of $NH_3$ occurs at a level 6 m below the surface level of the liquid in separator 3.

The inflowing heat amounted to 12,800,000 kCal/hr, of which 10,000,000 kCal/hr serve to evaporate 15.2 t/hr of water and 2,800,000 kCal/hr for heating the reactants and the dispersion or slurry.

The circulating solution heated up to 145.5° C. and the vapor tension rose to 1100 torr, compensated for by a liquid head of 5 m. The vapor that evolved was practically pure, that is, free of $NH_3$, the vapor tension of $NH_3$ being null. Moreover, no fogs were present but only droplets of liquid which were stopped and recovered by means of conventional mist-recovery equipment.

The neutralized slurry is useful for producing an ammonium nitrate fertilizer.

In accordance with the present invention, it will be appreciated that water vapor generated by the exothermicity of the reaction involving the absorption of the ammonia in the circulating acid slurry is developed only in the liquid-vapor separation zone 3 at a relatively lower pressure due to its higher level, while in the absorption zone at the lower level and therefore at a relatively higher pressure due to the hydraulic head, only a "simple" or relatively mild heating of the slurry is obtained without reaching the boiling point under the relatively higher pressure therein and therefore without producing any substantial evaporation of the water. In other words, there are two functionally different zones and the boiling point of the slurry is reached only when the reaction involving the absorption of the ammonia has been essentially completed.

What is claimed is:

1. A process for the absorption of gaseous or liquid ammonia in acid solutions or slurries, wherein
   an ammonia absorption zone is separated from a water vapor generation zone, in a system of recycling acid solutions or slurries, by creating a pressure difference between the two zones equivalent to a head of from 5 to 30 meters of a liquid slurry having a specific weight of 1.5 kg/$dm^3$, so that the ammonia absorption takes place completely in the neighborhood of the point of inflow of ammonia into the acid solution or slurry, with an increase of the temperature resulting therefrom localized near said inflow point, and thus without giving rise to the generation of water vapor at said inflow point, which therefore takes place in a liquid-vapor separation zone located in the system in a zone of lower pressure than the pressure of the ammonia absorption zone.

2. A process according to claim 1, wherein the acid solutions or slurries consist essentially of solutions of phosphoric acid, sulphuric acid, and nitric acid, solutions resulting from nitric acid attack on phosphorites, and acid slurries resulting from nitric acid attack or sulpho-nitric acid attack on phosphorites, or mixtures thereof.

3. A process according to claim 1, wherein between the point of inflow of the ammonia into the acid solutions or slurries and the liquid-vapor separation zone there is maintained a difference in height such that the pressure difference between the two zones is equivalent to a head of from 5 to 30 meters of a liquid slurry having a specific weight at 1.5 kg/$dm^3$, and wherein circulation of the acid solutions or slurries is brought about by means of a pump.

4. A process according to claim 1, wherein circulation of the acid solutions or slurries is brought about by gravity.

5. A process according to claim 1, wherein the effect of a difference in height is brought about by a suitable pressure loss.

6. A process according to claim 1, wherein the liquid-vapor separation zone is defined by a flash chamber.

7. A process for the reaction of gaseous or liquid ammonia with acid solutions or slurries, for the production of slurries suitable for the production of fertilizers, wherein a reaction zone is separated from a zone of water vapor generation, caused by the exothermicity of the reaction, in a system of recycling acid solutions or slurries, by carrying out the reaction under a liquid head at a pressure equivalent to a head of from 5 to 30 meters of a liquid slurry having a specific weight of 1.5 kg/$dm^3$, in a flow of slurry resulting from the reaction, and which is recycled at the boiling point and at the same pressure as in the zone of water vapor generation, in such a manner that the ammonia absorption by reaction thereof with the acid content of the acid solution or slurry produces a simple heating of the slurry without reaching the boiling point in said reaction zone under the relatively high pressure absorption conditions due to said liquid head, followed by evaporation of water elsewhere in the cycle in a vapor-liquid separation zone located at a higher level and therefore at a lower pressure with respect to the level and pressure in the reaction zone.

8. A process for the absorption and reaction of gaseous or liquid ammonia with acid solutions or slurries, for the production of a slurry suitable for the production of fertilizers, wherein the absorption of ammonia combined with reaction thereof with the acid content of the acid solution or slurry is carried out in a zone under a hydraulic head at a pressure equivalent to a head of from 5 to 30 meters of a liquid slurry having a specific weight of 1.5 kg/dm$^3$, in a recycling slurry resulting from said reaction, and the water vapor generated by the exothermicity of the reaction is developed in a separate liquid-vapor separation zone located at a substantially higher level and at a substantially lower pressure than the level and pressure in the ammonia absorption zone.

* * * * *